UNITED STATES PATENT OFFICE.

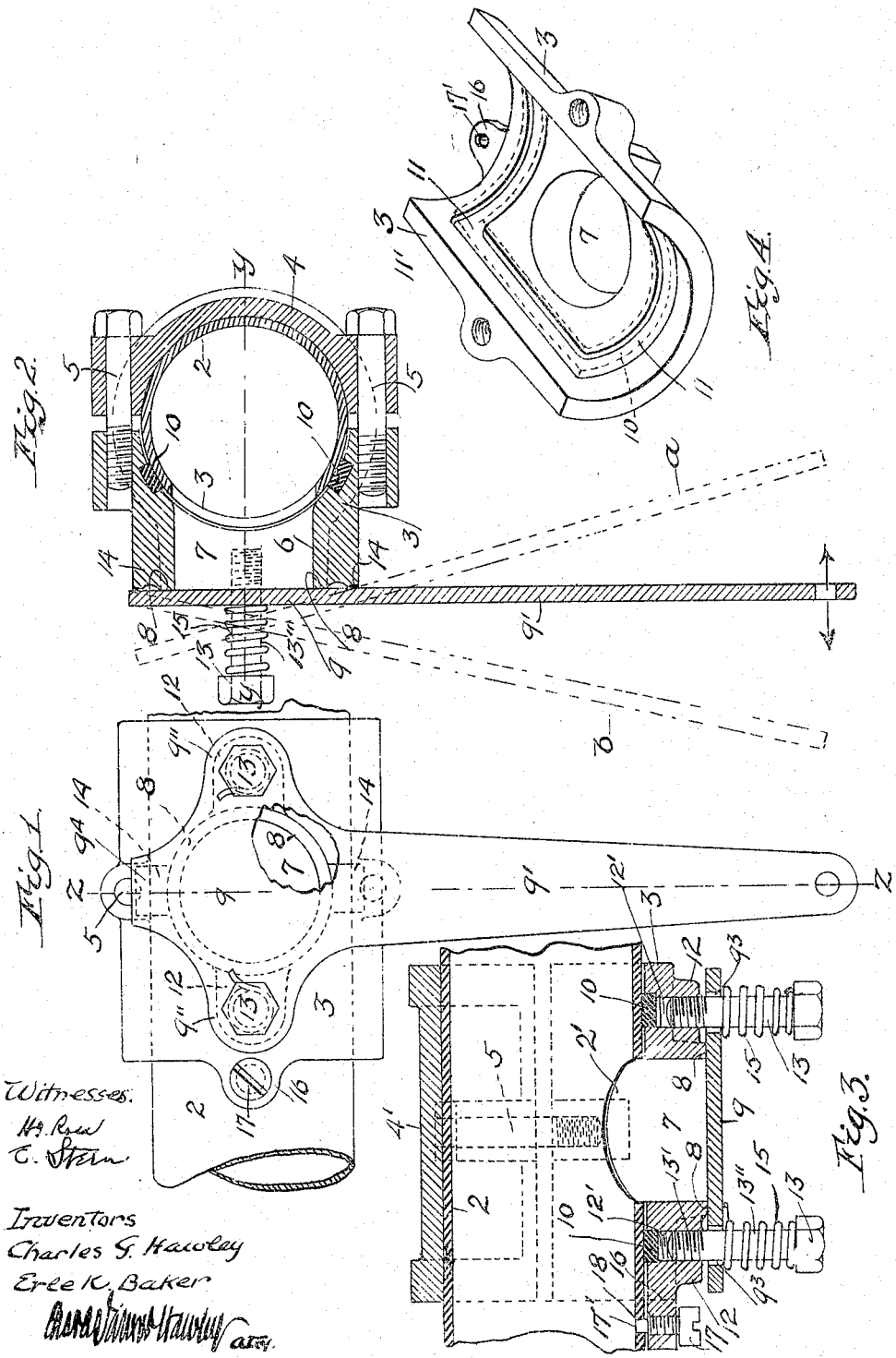

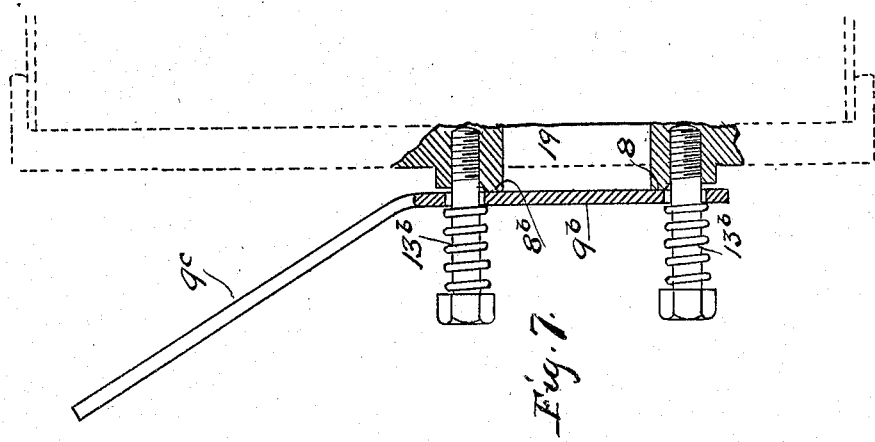
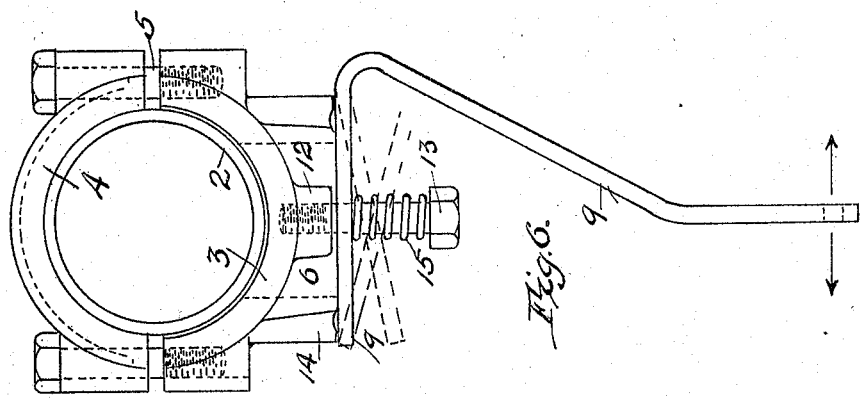
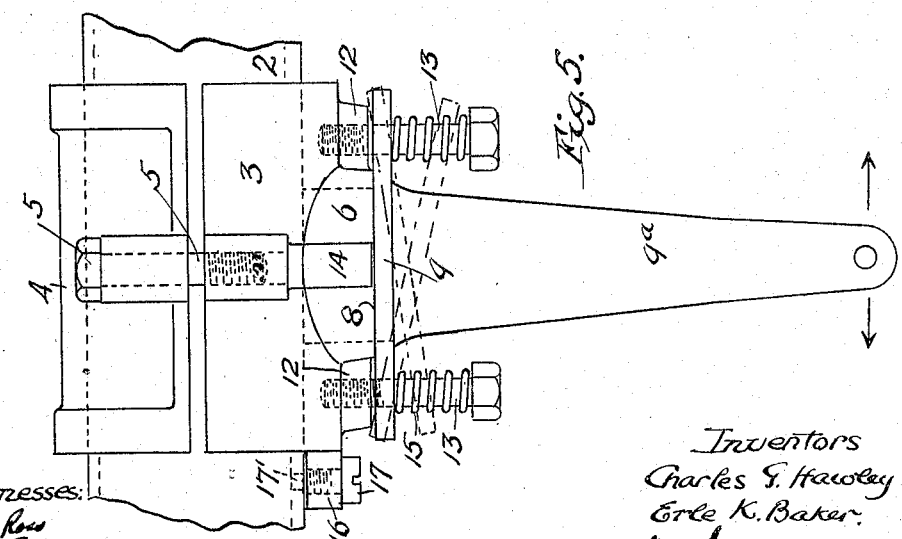

CHARLES GILBERT HAWLEY AND ERLE KING BAKER, OF CHICAGO, ILLINOIS.

MUFFLER CUT-OUT FOR AUTOMOBILES.

No. 931,011.           Specification of Letters Patent.        Patented Aug. 10, 1909.

Application filed September 8, 1908. Serial No. 451,953.

*To all whom it may concern:*

Be it known that we, CHARLES GILBERT HAWLEY and ERLE K. BAKER, citizens of the United States, and residents of Chicago, Cook county, Illinois, have invented certain new and useful Improvements in Muffler Cut-Outs for Automobiles, of which the following is a full, clear, and exact description, such as will enable others skilled in the art to make and use the same.

Our invention relates to means for relieving the pressure of the exhaust gases in the exhaust pipes or muffler pipes of hydrocarbon engines and the like. The invention has particular reference to improvements in valves for application to the exhaust pipes of such engines at points between the engine and the muffler.

The object of our invention is to provide an improved muffler cut-out valve which may be readily applied to an exhaust pipe or muffler, which shall be tight, which may be readily cleaned, which shall be easy to operate and which shall be of most simple construction and of low cost.

Our invention consists primarily in a valve having a flat valve face or seat in combination with a valve proper comprising a plate fitted to the valve seat and equipped with means by which it may be tilted upon or angularly positioned with respect to the valve seat to open the valve and spring means normally holding the valve proper or plate upon the valve seat, to close the opening or passage therein.

Our invention in its preferred form comprises a two-part sleeve adapted to be clamped upon a muffler or exhaust pipe, one part of said sleeve being provided with a gasket to encircle or inclose an outlet opening in said pipe and said part of the sleeve being provided with an opening or passage for communication with that in the pipe and terminating in a valve of the foregoing description.

The invention will be more readily understood by reference to the accompanying drawings, forming part of this specification and in which:

Figure 1 is a plan view or elevation of a muffler cut-out or relief valve embodying our invention. Fig. 2 is a sectional view thereof on the line Z—Z of Fig. 1. Fig. 3 is a sectional view on the line Y—Y of Fig. 2. Fig. 4 is a perspective view of the valved portion of the two-part or split sleeve, showing the packing groove which encircles or surrounds the outlet duct. Fig. 5 is a side view of the device showing a modified form of the valve plate or valve proper. Fig. 6 is an end view thereof and Fig. 7 is a sectional view illustrating a simpler form of our valve.

In these drawings 2 represents a portion of the exhaust or muffler pipe, between the explosion engine (not shown) and the muffler (not shown). Instead of cutting the pipe, to insert the valve we simply make a hole, 2', in the pipe, and clamp our valve over this opening. The opening may be made with ordinary hand tools, for example, a file, without resort to machine tools, and without removing the pipe from the automobile. In the preferred form of our valve the body portion of the device is made up of a sleeve of slightly greater diameter than the pipe to which it is to be fitted. This sleeve is split longitudinally, that is, it is formed in two parts, 3 and 4, joined by clamping bolts, 5. One bolt on each side is sufficient except in valves of more than ordinary sizes. The sleeve parts are preferably castings and on the part 3 we form the T or right angled portion, 6, containing an outlet opening duct or passage, 7. The T terminates in a flat end, face or seat, 8, to receive the valve plate or valve proper, 9, hereinafter more fully described. It will be noted that the duct, 7, and the hole, 3, in the pipe are smaller than the pipe, and that the opening in the pipe is entirely covered by the sleeve member, 3. To pack the joint between the member 3 and the side of the pipe we employ a strip of soft fireproof packing, 10. This we arrange in the groove, 11, formed in the member 3 and entirely surrounding the opening 7. We prefer that the packing groove shall be substantially rectangular, as shown in Fig. 4, and the packing is secured in this groove at the time that the valve is made, thus forming a permanent or integral part of the commercial article. Its appearance in the groove is indicated by the dotted lines in Fig. 4. The walls of the packing groove, 11, are preferably perpendicular to the bottom thereof and serve to retain the strip of packing, without other fastening means. The longitudinal walls, 11', at the two sides of the packing groove are parallel with the pipe and prevent the displacement of the packing when the member, 3, is forced upon the side of the pipe. The soft packing, 10, when first placed in the groove of the valve projects a considerable distance from the inner surface of the member, 3, and the adjustability thus secured renders it possible to fit our valve to pipes which are several sizes smaller than the maximum size that the valve will receive. Thus we not only secure the advantage of a tight, packed joint around the opening in the valve, without having to bore or finish the inside of the sleeve, but also reduce the number of the different sizes in which it is necessary to make the valve, for each size of the valve will fit pipes of several different sizes.

The seat, 8, for the valve, 9, is narrow and is circular, as shown by dotted lines in Fig. 1. It is formed by grinding off the end of the casting, i. e., the portion, 6. On opposite sides of the seat we form the lugs or projections, 12, of less height than the seat, 8, (see Figs. 3, 5 and 6.) The lugs, 12, contain threaded holes, 12', and in these we place the short bolts, 13. It should be noted that only short threads, 13', are provided on the ends of the bolts and that the latter are screwed home in the lugs. The shanks, 13'', of the bolts are smooth, between the bolt heads and the lugs, 12. This construction being desirable for the reason that the bolts serve as guides for the valves, 9. On opposite sides of the valve seat, at right angles, to the lugs, 12, 12, we form other lugs, 14. These we term fulcrum lugs. They may, if desired, extend to the plane of the valve seat, in which case they will be ground off at the same time as the seat, or they may stop short of the valve seat plane, as do the lugs, 12. So far as the operation of the valve is concerned, all of the lugs may be ground off simultaneously with the valve seat, but better seating of the valve is secured and considerable labor is saved by making the lugs slightly lower than the valve seat. As hereinafter explained the valve or plate, 9, may be tipped or tilted in any direction upon the valve seat, to open the valve, and any one of the lugs 12 and 14 may serve as the fulcrum at such time, or the edge of the valve seat may itself serve as the fulcrum for the valve proper.

The valve proper, 9, preferably takes the form of a simple flat plate punched from sheet stock and presenting its flat side to the valve seat, 8. One extension of the plate forms an operating lever or handle, 9', having a hole in its end for the operating cord. Other extensions of the plate form lateral ears, 9'', 9''. These contain holes, 9³, which are spaced to correspond with the bolts, 13. The holes are considerably larger than the bolts and allow the plate to shift upon the seat, 8, and in consequence the valve is self cleaning or may be easily reseated and cleaned at any time by movement of the valve across the seat. Compression springs, 15, on the bolts, 13, hold the plate or valve proper firmly upon the seat, 8, and at the same time allow the plate to be raised or tilted thereon. Obviously the ears 9'' and the parallel bolts, 13, 13, serve to guide the valve in its movement toward and away from the seat and co-act with the springs to properly re-seat the valve plate when it is released. An extension, 9⁴, of the plate, 9, covers the lug, 14, at one side of the seat and the other lug, 14, is covered by the lever or handle portion of the valve. The dotted lines, a, in Fig. 2 illustrate the position of the valve plate when fulcrumed or tilted upon the lower fulcrum lug, 14, and the dotted lines, b, represent the action of the valve when fulcrumed on the upper lug, 14. We prefer to fulcrum the plate on the lugs, rather than upon the edge of the valve seat. The valve seat is thereby relieved from wear by the sliding movement of the plate which occurs when the plate is lifted. As before suggested, the valve may be tilted in either direction on the valve seat, and when convenience of operation makes it desirable we bend or form the handle or lever portion of the plate in the manner shown in Figs. 5 and 6 and exert the pull thereon in either of the directions indicated by arrows in Fig. 5. When thus constructed the valve plate fulcrums on the lug 12, as indicated by dotted lines in Fig. 5. The valve lever of Figs. 5 and 6 also accommodates itself to movement in the direction of the arrows in Fig. 6, in which case the valve fulcrums on the lugs 14, as before explained in connection with Figs. 1 and 2. Diagonal movement of the valve plate causes it to fulcrum either upon the edge of the valve seat or upon two of the lugs, 12, 14. The guide bolts, 13, the springs, 15, and the large holes 9³, in the plate allow movement of the valve in all directions and also to prevent it from sticking open after it is released.

Considerable force is required to tilt or open the valve against the pressure of the springs, and, this force when exerted in the direction of the arrows in Figs. 2 and 6 tends to turn the valve as a whole upon the pipe. To prevent the displacement of the valve in this manner and to avoid either rotative or longitudinal displacement thereof upon the pipe by the vibration to which it is subjected, we pin or lock the valve upon the pipe in a manner shown in Figs. 1, 3 and 5. A lug, 16, projects from the end of the sleeve member, 3, and contains a set screw or locking screw, 17, preferably having a smooth end, 17', which occupies a hole, 18, in the side of the pipe. At the time that the valve is placed on the pipe and after it is properly positioned with respect to the hole, 3, therein, the set screw is removed from the lug and the lug is used as a gage in boring the hole, 18 in the pipe. After this is done the set screw is replaced and its end enters the hole in the pipe and positively locks or secures the valve body against movement on the pipe.

Our invention in its most simple form is illustrated in Fig. 7, wherein 19 represents a valve body portion, being a muffler head or other part. The seat, 8$^b$, is formed on the body part, 19, and the valve proper, 9$^b$, seats thereon. In this case the parallel guides, 13$^b$, are placed in line with the valve handle, 9$^c$. The valve handle, 9$^c$, may be bent or made in various forms to suit different conditions.

As various modifications of our invention will readily suggest themselves to one skilled in the art we do not confine our invention to the specific structures herein shown and described.

Having thus described our invention we claim as new and desire to secure by Letters Patent:

1. A muffler cut-out comprising a valve body containing an outlet duct or passage and, upon its exterior, at the end of said passage, provided with a flat valve face or seat, in combination with a flat plate normally seated on said seat and constituting the valve proper, guides for said plate, means pressing said plate on said seat, said plate being normally held in contact with the seat surface and tiltable on said surface and means for tilting the plate, substantially as described.

2. A muffler cut-out comprising a valve body containing an outlet duct or passage and having a valve seat at the outer end of said passage, in combination with a plate normally seated on said seat and constituting the valve proper, said plate being of greater width than said passage and seat and being normally held in contact with the seat surface and tiltable on said surface to open said passage, guides whereon said plate is slidable and means normally pressing the plate upon the seat, substantially as described.

3. A muffler cutout comprising a valve body containing an outlet duct or passage and, at the outer end of said passage, provided with a flat circular seat, in combination with parallel guide projecting from said body adjacent to said seat and substantially perpendicular to the plane thereof, a plate constituting the valve proper, said plate being loosely guided by said guide and oppositely tiltable upon said seat, means for tilting said plate and means normally pressing the plate upon said seat, substantially as described.

4. A muffler cut-out comprising a valve body containing an outlet duct or passage and having a flat valve seat upon its exterior at the end of said passage, in combination with a flat plate constituting the valve proper, guides for said plate, springs pressing the plate upon said seat, said plate being of greater width than said seat and tiltable thereon, means for tilting the plate and fulcrum lugs upon said body adjacent to said plate for engagement by said plate, substantially as described.

5. A muffler cut-out comprising a valve body having an outlet duct or passage and provided with a narrow, circular valve seat at the end of said passage, in combination with a flat plate of greater size than said seat, fulcrum lugs or points upon the valve body adjacent to said seat for engagement by said plate, said lugs being lower than said seat, plate guides perpendicular to said seat, compression springs on said guides adapted to hold the plate on the seat and means for tilting said plate, substantially as described.

6. A muffler cut-out comprising a valve body containing an outlet duct or passage and having a narrow circular valve seat upon its exterior at the end of said passage, in combination with parallel guides projecting from opposite sides of said seat and perpendicular to the plane thereof, a flat plate seated on said seat and tiltable thereon to open said passage, said plate being loosely guided by said guides, springs on said guides normally holding said plate upon said seat and said plate having an extension, forming an operating handle or lever, substantially as described.

7. A muffler cut-out comprising a valve body containing an outlet duct or passage and having a narrow circular seat upon its exterior at the end of said passage, in combination with a flat plate seated on said seat and constituting a valve proper, said plate being of greater diameter than said seat, fulcrum parts about said valve seat for engagement by said plate, means for tilting said plate, plate guiding means and springs normally holding said plate on said seat, said guiding means, plate and springs being formed to permit the tilting of the plate on the seat, to open said passage, substantially as described.

8. A muffler cut-out comprising a valve body containing an outlet duct or passage and having a narrow valve seat upon its exterior at the end of said passage, in combination with a plate constituting the valve proper, parallel bolts projecting from said body at opposite sides of said seat and perpendicular thereto, said plate having holes for said bolts and larger than the same, springs on said bolts pressing on said plate and means for tilting said plate on said seat, to open said passage, substantially as described.

9. A muffler cut-out comprising a valve body containing an outlet duct or passage and having a narrow circular seat on its exterior at the end of said passage, in combination with a flat plate constituting the valve proper, parallel guides for said plate, springs co-acting therewith to hold said plate on said seat and formed to permit said plate to be tilted upon said seat in either of several directions, and an arm or lever for tilting said plate, to open said passage, substantially as described.

10. A muffler cut-out comprising a valve body containing an outlet duct or passage having a flat valve seat at its end, in combination with a plate adapted to seat thereon and having an integral extension constituting an operating lever, parallel guides projecting from said body perpendicularly to the plane of said valve seat, said plate having guide holes and slidably engaged with said guides, springs pressing said plate upon said seat and said plate being tiltable upon said seat in either of several directions, to open said passage, substantially as described.

11. A muffler cut-out comprising a longitudinally divided sleeve and means for clamping the same upon a pipe, one member of said sleeve containing an outlet duct or passage terminating in a flat circular valve seat, in combination with parallel guides projecting from said parts said guides being perpendicular to the plane of said seat, springs on said guides, a flat plate loosely held by said guides and interposed between said springs and said seat, to close said passage, said plate being tiltable on said seat in several directions, an arm or lever attached to said plate for tilting the same to open said passage, substantially as described.

12. A muffler cut-out comprising a longitudinally divided sleeve and means for clamping same upon a pipe, one part of said sleeve containing an outlet passage to register with an opening in such pipe and also containing a packing groove surrounding the inner end of said passage, in combination with soft, fireproof packing in said groove, said packing projecting inwardly beyond the inner surface of the sleeve, said part of the sleeve having a valve seat upon its exterior at the outer end of said passage and a valve proper, spring pressed upon said seat, substantially as described.

13. A muffler cut-out comprising a longitudinally divided sleeve and means for clamping the same upon a pipe, in combination with means for positively locking one part of said sleeve against rotative or longitudinal movement upon such pipe, said part containing an outlet duct or passage and a valve proper normally resting on the seat surface and closing said passage and tiltable upon said surface, substantially as described.

14. A muffler cut-out comprising a longitudinally divided sleeve and means for clamping the same upon a pipe, in combination with means for positively locking one part of said sleeve against rotative or longitudinal movement upon such pipe, said part containing an outlet duct or passage and a valve proper normally closing said passage and tiltable in several directions to open said passage, substantially as described.

15. A muffler cut-out comprising a longitudinally divided sleeve and means for clamping the same upon a pipe, in combination with a valve provided on one part of said sleeve and a set screw in said part provided with a smooth cylindrical end for securing the sleeve against movement on such pipe, substantially as described.

16. A muffler cut-out comprising a longitudinally divided sleeve and means for clamping the same upon a pipe, in combination with a rectangular gasket or packing partially embedded in the inner side of one part of said sleeve, said part containing an outlet opening or passage surrounded by said packing and a valve closing the outer end of said passage, substantially as described.

17. A muffler cut-out comprising a longitudinally divided sleeve and means for clamping the same upon a pipe, in combination with a gasket of packing of compressible fireproof material, partially embedded in the inner side of one part of said sleeve, said part containing an outlet opening or passage encircled by said gasket, said part having a narrow circular valve seat upon its exterior at the outer end of said passage, parallel guide bolts projecting from said part on opposite sides of said seat and perpendicular to the plane thereof, springs on said bolts, a flat plate loosely engaged with said guide bolts, interposed between said springs and said seat and constituting the valve proper, fulcrum lugs on said sleeve part for engagement by said plate, means for tilting said plate in either of several directions, and means for positively locking said sleeve against movement upon such pipe, substantially as described.

In testimony whereof, we have hereunto set our hands this 5th day of September, 1908, in the presence of the subscribing witnesses.

CHARLES GILBERT HAWLEY.
ERLE KING BAKER.

Witnesses:
H. T. Ross,
E. Stern.